United States Patent [19]

Doi et al.

[11] Patent Number: 4,787,038
[45] Date of Patent: Nov. 22, 1988

[54] MACHINE TRANSLATION SYSTEM

[75] Inventors: Miwako Doi, Kawasaki; Tsutomu Kawada, Yokohama, both of Japan

[73] Assignee: Kabushiki Kaisha Toshiba, Kawasaki, Japan

[21] Appl. No.: 843,395

[22] Filed: Mar. 24, 1986

[30] Foreign Application Priority Data

Mar. 25, 1985 [JP] Japan .................................. 60-59881

[51] Int. Cl.$^4$ ............................................ G06F 15/38
[52] U.S. Cl. .................................. 364/419; 364/900;
434/157
[58] Field of Search ...................... 364/419, 200, 900;
434/157

[56] References Cited

U.S. PATENT DOCUMENTS

| 4,417,319 | 11/1983 | Morimoto et al. | 434/157 |
| 4,507,750 | 3/1985 | Frantz et al. | 364/900 |
| 4,542,478 | 9/1985 | Hashimoto et al. | 434/157 |
| 4,543,631 | 9/1985 | Kuroso et al. | 364/200 |

FOREIGN PATENT DOCUMENTS

| 0175357 | 3/1986 | European Pat. Off. . |
| 0247786 | 7/1985 | Japan . |
| 0200368 | 10/1985 | Japan . |
| WO82/00442 | 2/1982 | PCT Int'l Appl. . |
| 2033633 | 5/1980 | United Kingdom . |
| 2062916 | 5/1981 | United Kingdom . |

Primary Examiner—Jerry Smith
Assistant Examiner—Kim T. Bui
Attorney, Agent, or Firm—Oblon, Fisher, Spivak, McClelland, & Maier

[57] ABSTRACT

In a machine translation system, a translated-sentence possibility corresponding to an input original sentence is obtained by a translation processing section with reference to a dictionary, and is displayed to be divided by a division display control section into processing units in the translation processing section. When some portions of the original sentence have other translated-word possibilities in addition to the displayed translated-word possibilities, display control is performed by an identifying display control section so that the portions having other translated-word possibilities can be distinguished from portions having no such other translated-word possibilities and that classes of portions having the other translated-word possibilities are identified. Classes of the other translated-word possibilities are displayed in accordance with a predetermined priority order.

7 Claims, 5 Drawing Sheets

MACHINE TRANSLATION SYSTEM

BACKGROUND OF THE INVENTION

The present invention relates to a machine translation system for processing a sentence of a first language to obtain a translated sentence of a second language different from the first language and, more particularly, to a machine translation system with high operability, which easily selects translation results of an original sentence and corrects the selected translation result.

In recent years, machine translation systems for automatically processing an input original sentence by using a computer to obtain the translation have received a great del of attention. In a conventional machine translation system, the morpheme, structure, and/or other components of an input original sentence are analyzed so as to divide the original sentence into predetermined translation processing units. A translation dictionary is accessed for every translation processing unit in order to obtain words or phrases in a second language corresponding to the processing unit. The readout words and/or phrases are connected and/or arranged in accordance with predetermined grammatical rules so as to obtain a translated sentence.

However, since written works input into a machine translation system contain native idioms and the like, and a technique for completely analyzing their meanings has not yet been established, it is very difficult to obtain reliable and appropriate translated sentences. For this reason, in the conventional machine translation system, a plurality of translation possibilities are presented to a user (i.e., an operator) when an original word or phrase has more than one possible translation. The operator selects the most appropriate one of these possibilities and the selected possibility is output as the translation. Adverbs or adverbial phrases in a translated sentence which may be grammatically arranged at any one of a plurality of positions in the sentence are displayed in different positions, and the most appropriate one is selected by the operator.

Basically, translation possibilities are selected in the following way. If a word has different meanings, one of these meaning is selected. If it possibly modifies two or more words or is possibly modified by two or more words, one of these words is selected. If it can be used as two or more parts of speech, one of these parts of speech is designated. In most cases, one meaning of the word is closely related to one particular word or words modifying the word or modified by the word and is identified by the part of speech of the word. Hence, the translation possibility selected first for a first word often reduces the number of translation possibilities for a second word which is syntactically and semantically related to the first word. For example, once the part of speech has been designated for one word, one of the words which possibly modify this word or are modified by this word is automatically selected. This automatic selection often turns out to be an error, and this is one drawback of the machine translation system.

In order to prevent such a drawback, a user, who fully understands the translation processing function of the system and has sufficient knowledge of the language of the translated sentences can select an appropriate translation possibility. However, it is not practical to require all user to have full understanding of the translation processing function and the language of the translated sentences. Even if a user has this knowledge, as long as the translation system depends on the user's knowledge, operability of the system cannot be improved and the system cannot carry out its designed function.

SUMMARY OF THE INVENTION

It is an object of the present invention to provide a machine translation system with high operability, in which an appropriate possibility can be easily and reliably selected from a plurality of translation possibilities obtained by translation processing, and a translated result most suitable to an input original sentence can be effectively obtained.

In a machine translation system of the present invention, a translation possibility of an input original sentence, obtained by a translation processing section with reference to a dictionary, is displayed such that it is divided into processing units. If some portions of the translation possibility have other translation possibilities in addition to the displayed possibility are present, such portions and classes of selection items (e.g., meaning selection, modification selection, and part-of-speech selection) of such portion are also displayed to be distinct from other portions. In this case, different display attributes corresponding to respective selection item classes are used, allowing easy identification of the items. The identifying display for the selection items is provided for each translation processing unit of the divisionally displayed translated sentence. When a plurality of classes of selection items to be identified are present, they are displayed in accordance with a predetermined priority.

According to the machine translation system of the present invention, when a translation possibility obtained by the translation processing section includes data to be selected, the possible position of the data in the displayed processing unit is indicated, and at the same time, the class of the data is indicated in accordance with the predetermined priority. In this way, a user can make appropriate selections with reference to the displayed data. Since the data to be selected is displayed for each translation processing unit, a user can recognize it easily. Since the class of the data to be selected is displayed in accordance with the predetermined priority, later selections will not be undesirably restricted by previously selected data. Therefore, a selection operation can be greatly simplified, and an appropriate translation result can be easily obtained.

DETAILED DESCRIPTION OF THE PREFERRED EMBODIMENTS

A machine translation system according to an embodiment of the present invention will be described with reference to the accompanying drawings.

Figure 1:
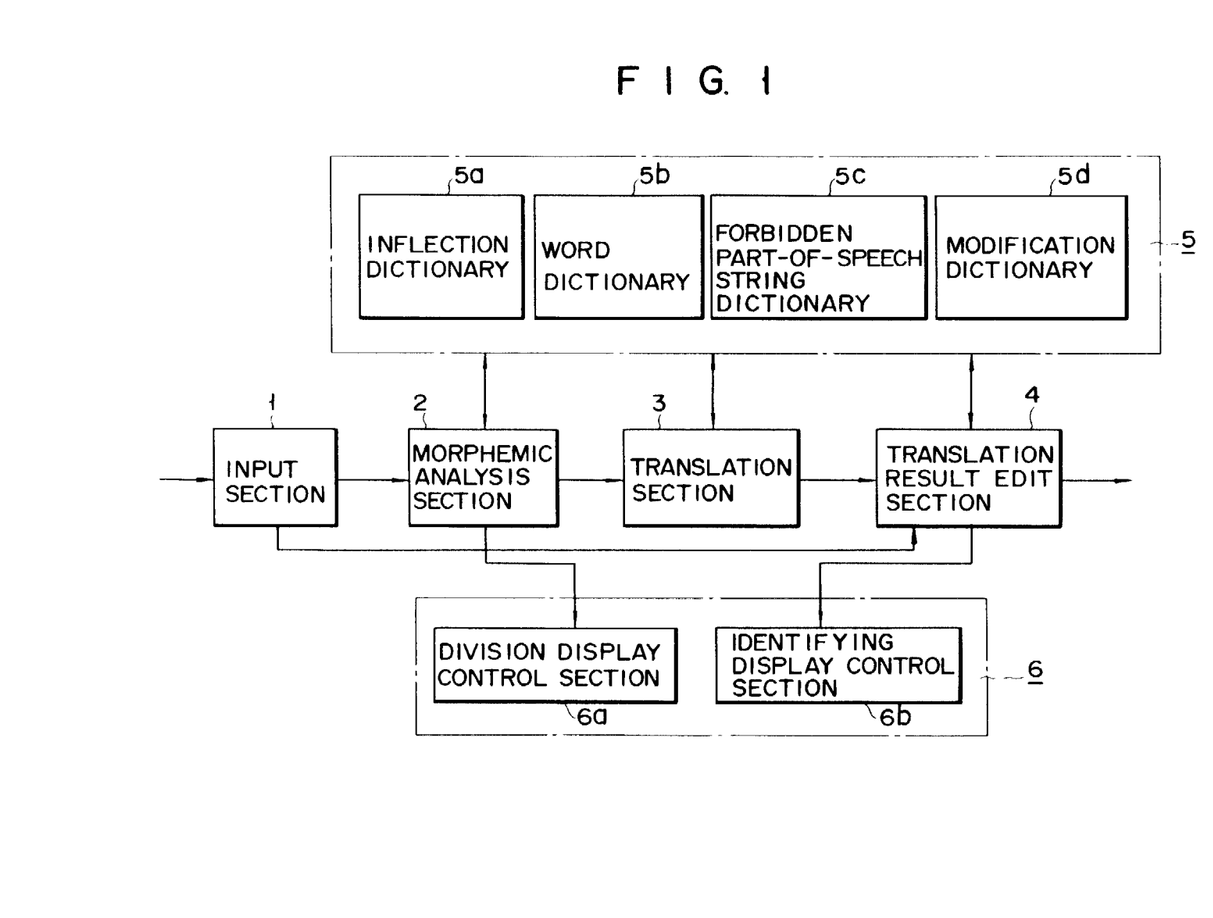
FIG. 1 is a block diagram schematically showing a machine translation system according to an embodiment of the present invention.
Figure 2:
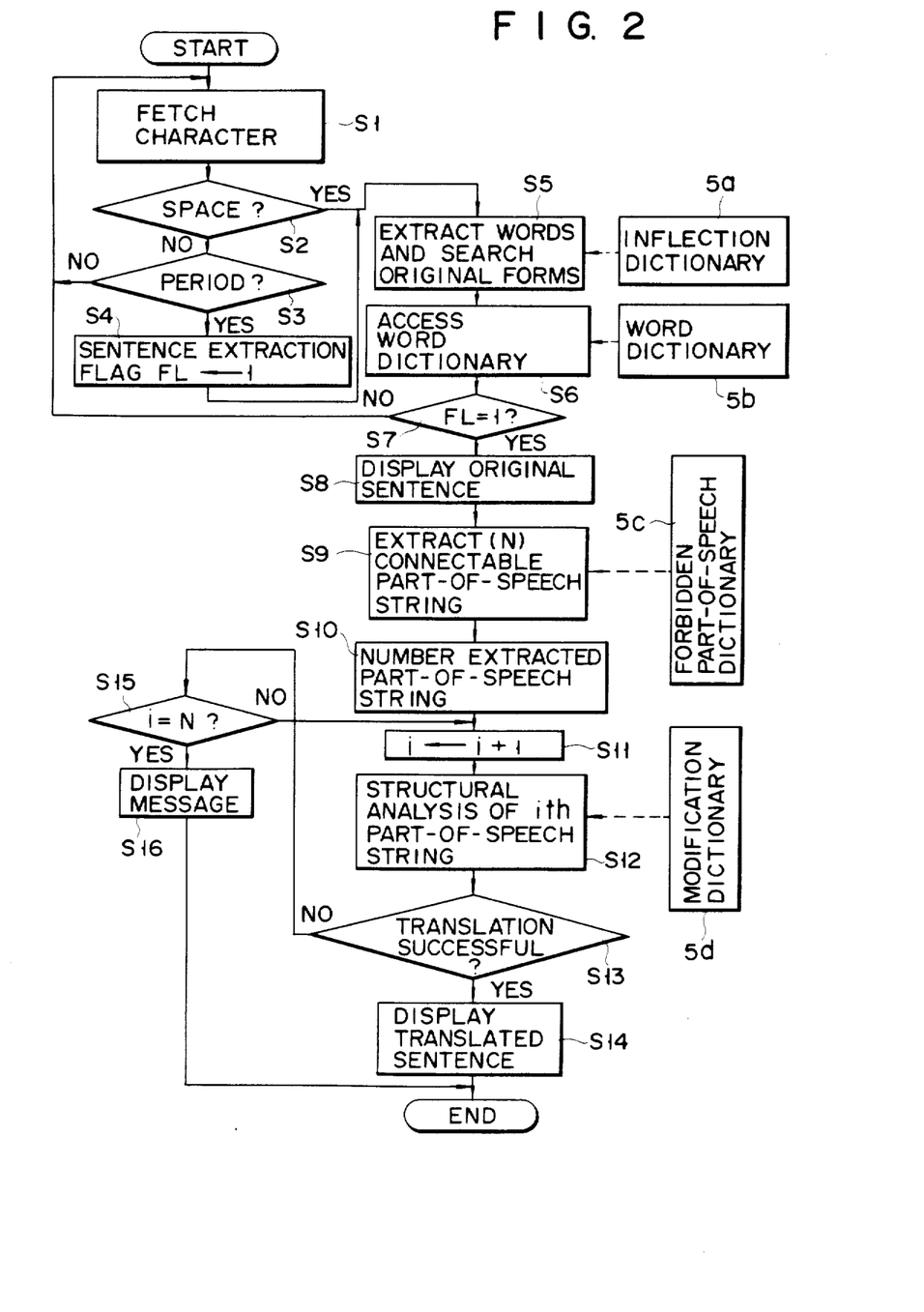
FIG. 2 is a flow chart schematically showing translation procesing in the system of FIG. 1.
Figure 3:
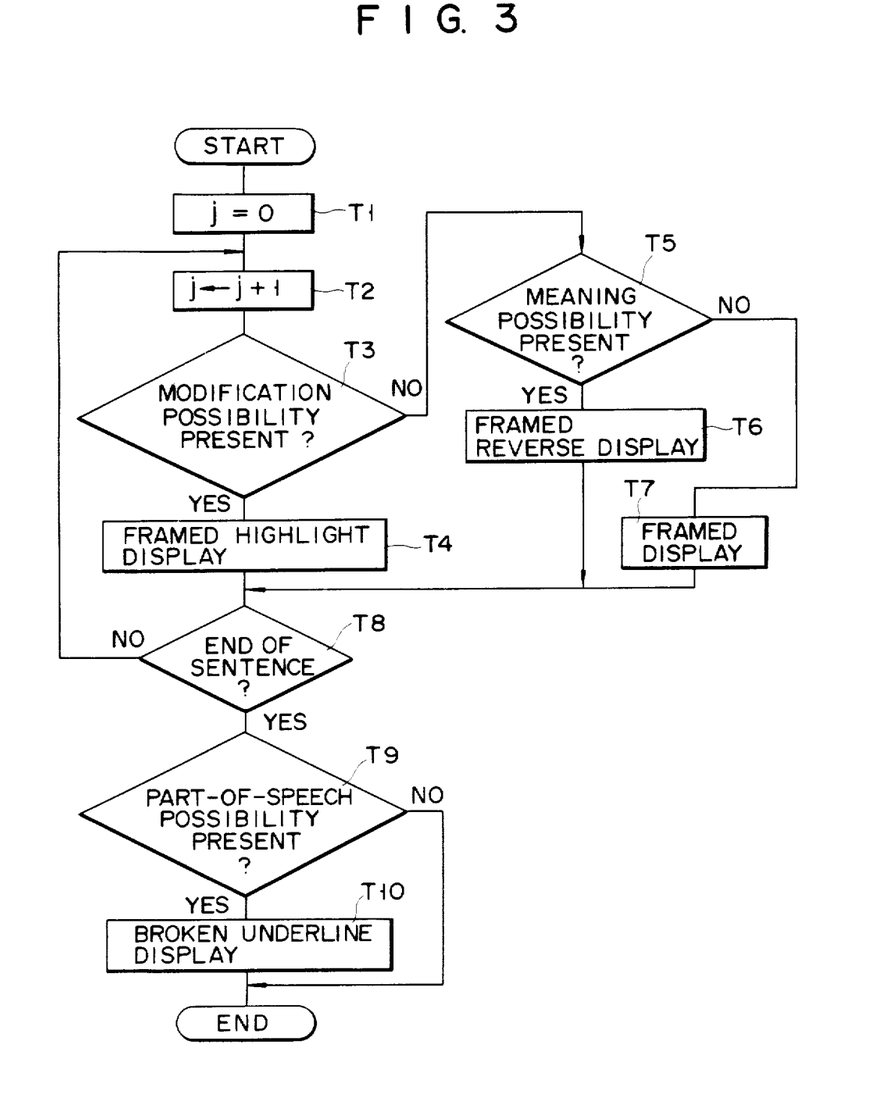
FIG. 3 is a detailed flow chart of the translated sentence display processing shown in FIG. 2.

FIG. 1 schematically shows a machine translation system according to the embodiment of the present invention, and FIGS. 2 and 3 show translation processing flow in the system shown in FIG. 1. The system of this embodiment is exemplified by translation from English (original sentence) to Japanese (translated sentence). However, the original and translated sentences are not limited to those languages.

Input section 1, shown in FIG. 1, is used for sequentially inputting original sentences (e.g., English) to be subject to translation processing in the system of the present invention. Input section 1 comprises a keyboard and/or other input devices. The original sentences can be input by sequentially inputting character strings in section 1 so as to reproduce the original sentences. However, original sentences can be reproduced in advance by a separate device and transferred intact from the device into the system. Alternatively, original sentences can be similarly reproduced by a separate device and transferred one sentence at a time into the system. The original sentence input operation in section 1 can be replaced with one of or a combination of the above methods.

A translation processing apparatus, which plays a main role in the tanslation processing of this system, comprises morphemic analysis section 2, translation section 3, and translation result edit section 4. The translation processing apparatus executes translation processing of original sentences with reference to dictionary 5. Translation possibilities for an original sentence obtained by the translation processing apparatus are displayed by display device 6. Dictionary 5 is a translation data base stored in a memory, and, in this case, comprises inflection dictionary 5a, word dictionary 5b, forbidden part-of-speech string dictionary 5c, and modification dictionary 5d. Inflection dictionary 5a stores data associated with original and regular/irregular forms of original (English) declinable words, e.g., nouns, verbs, and adjectives. An original (basic) form of a desired word can be read out from dictionary 5a in reference to its inflected form. Word dictionary 5b stores data associated with original and translated words, from which a certain translated word and data associated therewith (e.g., part-of-speech data) can be read out with reference to the corresponding original word. Forbidden part-of-speech string dictionary 5c stores string data for those part-of-speech which cannot be connected to each other in a given grammatical arrangement of a translated sentence. Modification dictionary 5d stores modification data for translated words, i.e., data of relationships between translated words when different words for an original word can be selected depending upon the modification relationship.

Morphemic analysis section 2 divides original sentences into phrases and further, into words.

As shown in FIG. 2, original sentence data is fetched in character by character (step S1), and it is determined in step S2 if an input character is a "space". If NO in step S2, it is determined in step S3 if the input character is a "period". If YES in step S2, a character string immediately preceding the space is extracted as one word (step S5). If YES in step S3, it is determined that the period is an end of a sentence, and sentence extraction flag FL is set at "1" (step S4). Dictionary 5a is accessed in respect to the word extracted, based on the determination in step S2. When the word is inflected, its original form is read out (step S5).

When an end of the sentence is detected in step S3, translated words and data associated therewith are obtained, as will be described later. Although not shown in FIG. 2, flag FL is then reset to "0", and similar processing is repeated with the next input character string.

Words extracted by section 2 together with their original forms, if read out, are supplied to translation section 3. In section 3, dictionary 5b is accessed, and translated words and data associated therewith (e.g., part-of-speech data) are read out (step S6).

The above processing is repeated until an end of one sentence (a period) is detected by determining if flag FL is at "1" (step S7).

In this manner, when one of the original sentences is input and translated words and data associated therewith are obtained, section 3 supplies these translation results to translation edit section 4. Morphemic analysis section 2 causes display device 6 to display input character strings up to the detection of a period as an end of one original sentence (step S8).

In section 4, one input original sentence is taken as one edit processing unit, and translation possibilities that are grammatically correct are automatically fetched. In edit processing of the translation possibilities, combinations of translated words which form part-of-speech strings that are syntactically incorrect are excluded from consideration and grammatically correct combinations are extracted (step S9). With this method, a plurality (N) of translated sentences (part-of-speech strings) are generally extracted as translation possibilities.

In step S10, a series of sentence numbers i (i=1 to N) are assigned to the extracted translation possibilities and simultaneously, the variable i value designating each translation possibility is initialized (i=0). The extracted translation possibilities are then subject to the following selection processing.

The variable i value designating the translation possibilities is incremented by +1 (step S11) and one translation possibility is selected. Structure of the selected possibility is analyzed with reference to modification data stored in dictionary 5d (step S12). It is determined in step S13 from the result of the structural analysis if the translation processing was successful. If YES in step S13, the translated sentence is displayed by display device 6 (step S14). However, if NO in step S13, i.e., if it is determined from the structural analysis (step S12) that the processing was unsuccessful, the translation possibility at the sentence number i is excluded as an inappropriate sentence. It is then checked if a second translation possibility is present (step S15). If NO in step S15, the processing including steps S11, S12, S13, and S15 is repeated. If YES in step S15, a message (indicating that translation of the input sentence was unsuccessful) is displayed by display device 6 (step S16), and translation processing is ended.

As described above, translation processing of one sentence (translation processing unit) obtained by section 2 is completed. The control then advances to translation processing of the next extracted sentence.

In response to translation processing by the translation processing apparatus, display device 6 is operated in the following manner.

Device 6 comprises a display for displaying original sentences and translated sentences (translation possibilities) obtained by translation processing. Device 6 further comprises division display control section 6a and identifying display control section 6b (shown in FIG. 1) for controlling display of the translated sentences.

Section 6a receives paragraph spacing data, sentence spacing data, and word spacing data obtained by section 2. Section 6a controls the display with respect to the paragraph spacing data so that translation possibilities displayed are divided into paragraphs, i.e., large translation processing units. More specifically, translation results for each paragraph (translated in consideration of the context of each paragraph) are displayed so that a blank space is interposed between each paragraph. With this display control, large translation processing units obtained fom the translation processing apparatus are clearly defined.

Section 6a controls the display in accordance with the sentence spacing data so that translation possibilities displayed are divided into sentences, making relatively large translation processing units. For example, translation possibilities corresponding to original sentences (each constituting one translation processing unit) are sequentially displayed so that each possibility is on a new line or with a blank space interposed between each sentence. With this display control, translated processing sentence units obtained from the translation processing apparatus are clearly defined.

Finally, section 6a controls the display in accordance with the word spacing data so that translation possibilities displayed are divided into words (minimum translation processing units), thereby clearly defining translated words corresponding to individual original words. More specifically, translated words are displayed with frames surrounding each word. Alternatively, translated words can be displayed with a space interposed between each adjacent word. With this display control, translated processing word units obtained from the translation processing apparatus are clearly defined.

In this manner, original sentences are displayed so that their processing units are identified in terms of paragraphs, sentences, and words by section 6a.

In section 6b, additional display control is performed with respect to translation possibilities divisionally displayed by section 6a. When a plurality of translated words to be selected are present for a processing unit, the position of the translated word and classes of data to be selected are displayed so as to distinguish them from other words. More specifically, translation possibilities are displayed so that display attributes differ in accordance with the different classes of selection data. This display control is performed in accordance with data obtained by section 4, independent of the above-mentioned division display control of section 6a.

As described above, selection items associated with translation possibilities include selection of a translation possibility itself, selection of translated words constituting a translation possibility, and the like. In this case, the selection of translated words includes: selection of parts of speech when an original word in an original sentence has a plurality of corresponding translated words of different parts of speech; selection of modifications of translated words when the meaning of the original translated word changes in accordance with prior or subsequent translated words in the sentence (text); and selection of meanings when an original word has a plurality of meanings.

Section 6b determines classes of selection items from the relationship between translated words in a plurality of translation possibilities obtained by section 4, and displays translated words with different display attributes in accordance with the determined classes.

These display modes can be any one of various display attributes and/or combinations thereof. Character display attribute include display at different illuminances, display in different colors, overlined display, underlined display, reverse display, blink display and the previously mentioned framed display. Display attribute control is performed with respect to translated words and selection item data so that each segment of a divisionally displayed translation processing unit is used as a display control division. This display control allows easy identification of positions of data and classes of selection items to be selected in the displayed translated sentence.

In this case, a single translated word may include a plurality of classes of selection items. However, the classes of selection items have a predetermined priority in the order of selection as follows. The "selection of meanings" has priority over the "selection of parts of speech", and the "selection of modifications" has further priority over the "selection of meanings". When the selection is performed in the above order of priority, the first selected item limits the scope of possibilities for the other selection items, and choices outside the limited range are not possible. More specifically, when a specific item is selected first, selection contents of the remaining items that will mesh correctly with the first item are determined, and selection other than the determined contents is not possible. The class of selection item having the highest priority is identified on the display by control section 6b in accordance with the predetermined priority. After the highest priority selection item is selected, a class of selection item having the next highest priority is identified on the display. In this manner, every time selection of an item is completed, the class of selection item having the next highest priority is displayed.

With this display control of translation possibilities, a user (operator) can reliably recognize translation words to be selected, and the class of selection items thereof, with reference to the display mode of the translation possibility. At the same time, he can recognize the priority of the selection items. In order to designate a selection position by moving a cursor and permit display device 6 to display the next translation possibility under the control of section 4, the operator operates a keyboard provided at input section 1. At this time, selection data for selection items is sequentially provided, and a reliable translated sentence corresponding to an original sentence can be easily obtained.

FIG. 3 is a detailed flow chart showing display control, i.e., step S14 of FIG. 2. The flow chart shown in FIG. 3 is mainly related to display device 6.

Variable j, indicating a number corresponding to a word of a translated sentence, is initialized (j=0) (step T1).

Next, variable j is incremented by +1 (j←j+1) (step T2). It is checked if a jth word corresponding to variable j includes other modification possibilities, i.e., if a plurality of modification possibilities are present (step T3). If YES in step T3, the corresponding word is surrounded by a frame and displayed at high illuminance (step T4). If NO in step T3, it is checked if the jth word includes other meaning possibilities, i.e., if a plurality of meaning possibilities are present (step T5). If YES in step T5, the corresponding translated word is frameand reverse-displayed (step T6). If NO in step T5, the translated word is frame-displayed (step T7).

When display processing in any of steps T4, T6, and T7 ends, it is checked if the jth word is located at the end of a sentence (step T8). If NO in step T8, the flow returns to step T2, and the above processing is repeated.

However, if YES in step T8, it is checked if the jth word includes other part-of-speech possibilities, i.e., if a plurality of part-of-speech possibilities are present (step T9). If YES in step T9, the translated word is underlined with a broken line (step T10). If NO in step T9, the flow is ended.

Data display control for selecting translation possibilities will be explained in more detail with reference to FIG. 4.

When sentence A "Time flies like an arrow." is input as an original sentence, divisions of words constituting sentence A are detected by section 2, and sentence A is divided into words. Translated words and data (parts of speech) B associated therewith are obtained by accessing dictionary 5. The translated words and data B corresponding to the original words will now be described in detail.

Original word "time" is used as a verb and a noun. As a verb, word "time" has corresponding translated word J1, "hakaru (record the time)" and translated word J2, "toki wo shiteisuru (set the time)". As a noun, word "time" has corresponding translated word J3, "toki (time [clock time])", translated word J4, "hima (duration)", and translated word J5, "kikan (period)", and the like. An original form of original word "flies" is "fly", which can be a noun or a verb. As a noun, word "fly" has corresponding translated word J6, "hae (fly [winged insect])" and translated word J7, "kebari (fly [fishhook]) ". As a verb, word "fly" has corresponding translated word J8, "tobu (fly [move through the air])" and translated word J9, "hikouki de iku (travel in an airplane)". Original word "like" acts as a verb, preposition, and the like. As a verb, word "like" has corresponding translated word J10, "konomu (like [be fond of])" and translated word J11, "nozomu (wish to have)". As a preposition, word "like" has corresponding translated word J12, "no youni (like [in the same way as])". Original word "a" is an article. Since no articles are used in Japanese, a translated word corresponding thereto does not exist. Original word "arrow" is a noun, which has corresponding translated word J13, "ya (arrow [weapon])" and translated word J14, "yajirushi (arrow [directional arrow])".

Translated words corresponding to individual words and part-of-speech data are supplied to setion 4. Section 4 excludes unconnectable parts of speech in a grammatically correct arrangement of the translated words after accessing dictionary 5c. Thus, three combinations C of parts of speech which are allowed in the words constituting sentence A, are obtained and shown as:
[1] VERB + NOUN + PREPOSITION + NOUN
[2] NOUN + VERB + PREPOSITION + NOUN
[3] NOUN + NOUN + VERB + NOUN
At the same time, section 4 also analyzes that in [1] and [2], there are two prepositional phrase possibilities: one for modifying the verb as an adverb phrase, or another for modifying the noun as an adjective phrase. In addition, section 4 analyzes that the noun modified by the adjective phrase, as in [1] includes a plurality of meaning possibilities.

Section 4 also obtains modification data associated with the words with reference to dictionary 5d.

Figure 5A:
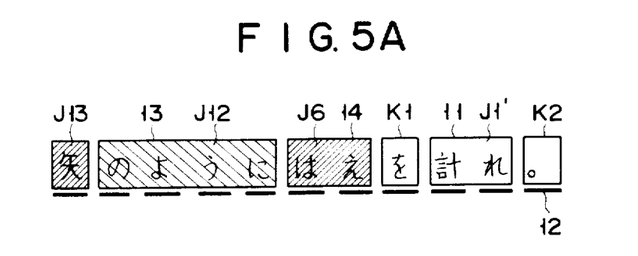
FIGS. 5A to 5C are illustrations showing display examples in the system of FIG. 1.

Based on the analyzed results, the translation possibility corresponding to the original words is divisionally displayed by section 6b so that each translated word is surrounded by a frame, as shown in FIG. 5A. Simultaneously, broken-underline 12 is added to the displayed translation possibility, thereby indicating that a plurality of part-of-speech possibilities are present for the displayed translated sentence.

Figure 4:
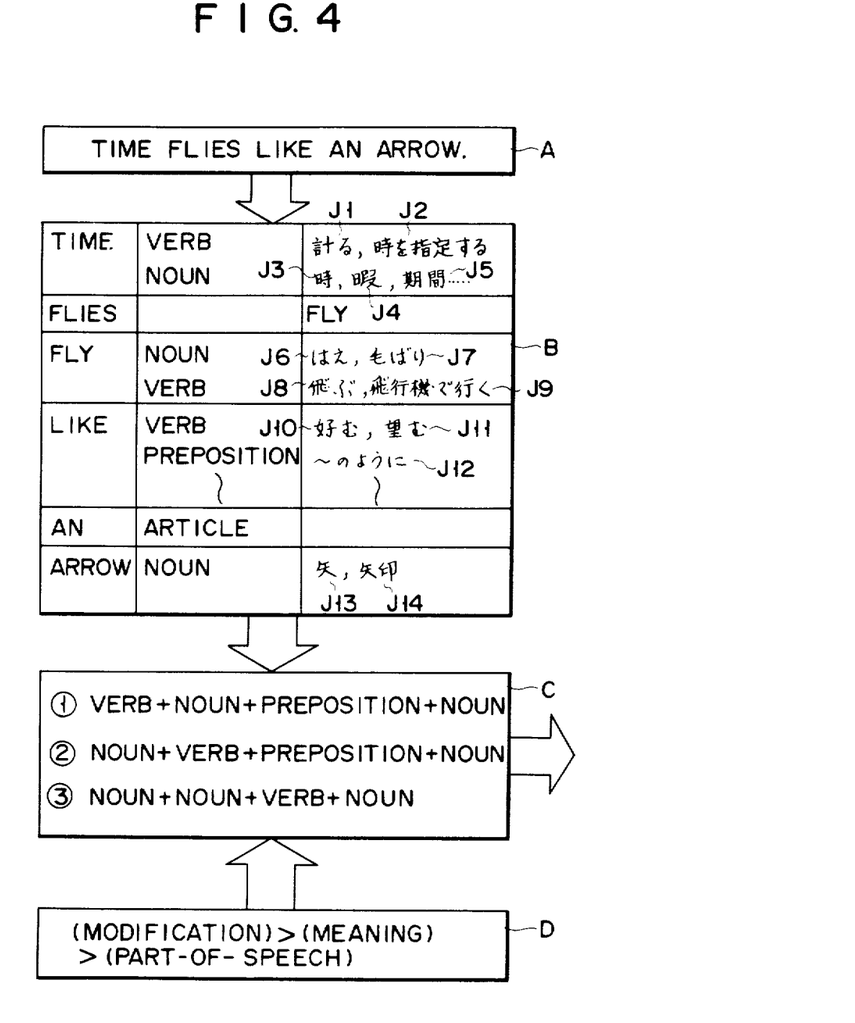
FIG. 4 is a view for explaining display control of a translation possibility in the system of FIG. 1.

Translated word possibilities corresponding to the original words are displayed based on priority D of selection data shown in FIG. 4, in accordance with the flow chart shown in FIG. 3. A translated word having other modification possibilities is highlight-displayed by section 6b (indicated by reference numeral 13), and a translated word having another meaning possibility is reverse-displayed (as indicated by reference numeral 14).

Figure 5B:
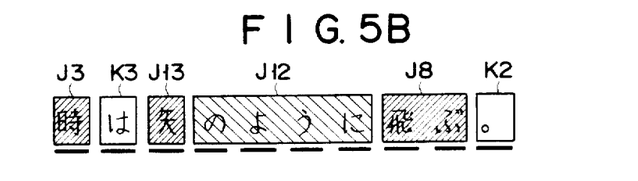

When a "next possibility" is designated by aligning a cursor of display device 6 to location K1 of a translated sentence: J13 + J12 + J6 + K1 + J1' + K2 (K1 and K2 being morphemes derived depending on sentence structure, in which K1 takes an object, K2 indicates the end of the sentence, and J1' is a inflected form of J1), as shown in FIG. 5A, since only selection of parts of speech indicated by underline 12 is designated in this division, the translation apparatus determines that this designation is to select part-of-speech possibilities. As a result, parts of speech combination [2] is selected, and the selected translated sentence is then displayed: J3 + K3 + J13 + J12 + J8 + K2 (K3 being a morpheme derived depending on sentence structure and taking a subject), as shown in FIG. 5B. In this way, data for indicating selection of modifications, meanings, and the like are similarly displayed.

Figure 5C:
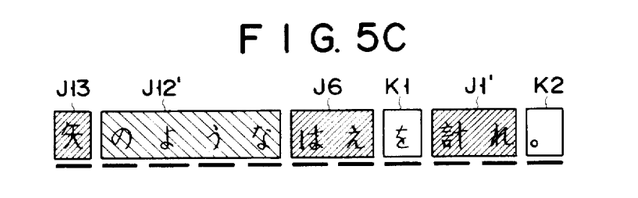

On the contrary, when the "next possibility" is designated by adjusting the cursor to location J12 without designating K1 in the manner shown in FIG. 5A, the operation is as follows. In the display of FIG. 5A, the location of J12 indicates selection of modifications, this having a higher priority than the selection of parts of speech. For this reason, upon designation of the "next possibility", a translated sentence: J13 + J12' + J6 + K1 + J1' + K2 (J12' being a declined form of J12) having different modification possibilities is displayed, as shown in FIG. 5C.

Likewise, when the "next possibility" is designated by adjusting the cursor to location J6 in FIG. 5A, which indicates selection of meanings, J7, for example, is displayed in place of J6.

Therefore, an operator can recognize classes of selection data and positions of data to be selected at a glance. Thus, when the operator designates selection in displayed data by designating data positions, proper translation editting is enabled. Operability is thereby greatly improved, load on an operator is considerably reduced, and an appropriate translated sentence corresponding to an original sentence can be easily and reliably obtained.

The present invention is not limited to the above embodiment. For example, in the above embodiment, translation processing from English to Japanese has been described. However, the present invention can be similarly applied to translation processing from Japanese to English. In order to identify classes of selection data, various methods can be adopted (e.g., adding a specific symbol before and/or after a certain division) in addition to the use of display attributes. An algorithm of translation processing, arrangement of dictionaries, rules for translation processing, etc. can be set as desired in accordance with specifications required for the apparatus. Various other changes and modifications may be made within the spirit and scope of the invention.

What is claimed is:

1. A machine translation system comprising:

translation processing means for processing an input original sentence so as to obtain translated-word possibilities and translation data associated therewith corresponding to translation processing units of the original sentence, thereby producing a translated-sentence possibility, formed of selected translation processing units, corresponding to the original sentence, said translation processing means including syntax determining means for determining improper combinations of translated words and producing said translated sentence possibility only in accordance with predetermined grammatical rules;

display means for displaying the translated-sentence possibility produced by said translation processing means;

division display control means, operated in response to the processing of said translation processing means, for controlling said display means so that the displayed translated-sentence possibility is divided into the translation processing units in said translation processing means and is displayed on said display means;

identifying display control means, operated in respose to the processing of said translation processing means, for controlling said display means in such a manner that, if portions of the original sentence have other translation processing units in addition to the displayed translation processing units, the translated-sentence possibility is displayed so that positions of said portions of the original sentence having the other translation processing units and classes of the other translation-processing units are identified; and selection means to enable an operator to select an appropriate translation processing unit while displaying the other translation processing units on said display means.

2. A system according to claim 1, wherein the classes of other translation processing units, which are identified and displayed by said identifying display control means, include selection of meanings, selection of modifications, and selection of parts of speech.

3. A system according to claim 1, wherein said identifying display control means comprises:

means for controlling display so that the other translation processing units are displayed with display attributes which differ in accordance with the classes of the other translated-word possibilities.

4. A system according to claim 1, wherein said identifying display control means comprises:

means for controlling display so that the classes of the other translation processing units are displayed with identification symbols which differ in accordance with the classes of other translation processing units.

5. A system according to claim 1, wherein said identifying display control means comprises:

means for performing identifying display of the classes of the other translation processing units of the translated-sentence possibility which is divisionally displayed by said division display control means.

6. A system according to claim 1, wherein said identifying display control means comprises:

means for controlling display so that, when a plurality of classes of the other translation processing units must be identified, at least some of the classes are selectively identified and displayed in accordance with a priority of the classes.

7. A system according to claim 1, wherein said identifying display control means comprises:

means for controlling display so that, when a plurality of classes of the other translation processing units must be identified and displayed, said other translation processing units are identified and displayed by means of predetermined identification factors, the identification factors of at least some of the plurality of classes being displayed to overlap.

* * * * *